W. H. and L. Young's Castor for Trunks, etc.

No. 72956

Witnesses:
J. L. Newton
L. F. Lambert

Inventor:
W. H. Young
L. Young

PATENTED DEC 31 1867

United States Patent Office.

W. H. YOUNG AND L. YOUNG, OF BOSTON, MASSACHUSETTS.

Letters Patent No. 72,956, dated December 31, 1867.

IMPROVED CASTER FOR TRUNKS.

*The Schedule referred to in these Letters Patent and making part of the same.*

TO ALL WHOM IT MAY CONCERN:

Be it known that we, W. H. YOUNG and L. YOUNG, of Boston, in the county of Suffolk, and State of Massachusetts, have invented a new and useful Caster for Trunks, &c.; and we hereby declare that the following is a full and exact description thereof, reference being had to the accompanying drawings, and to the letters of reference marked thereon, making a part of this specification, of which—

Figure 1:
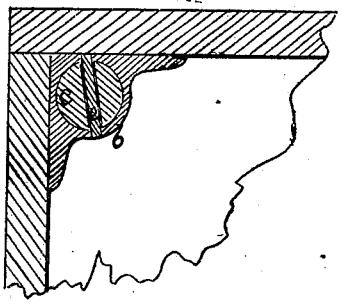
Figure 2:
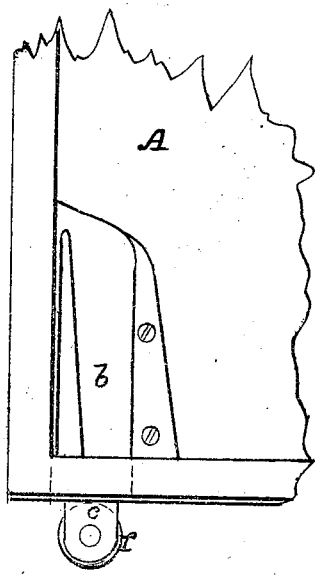
Figure 3:
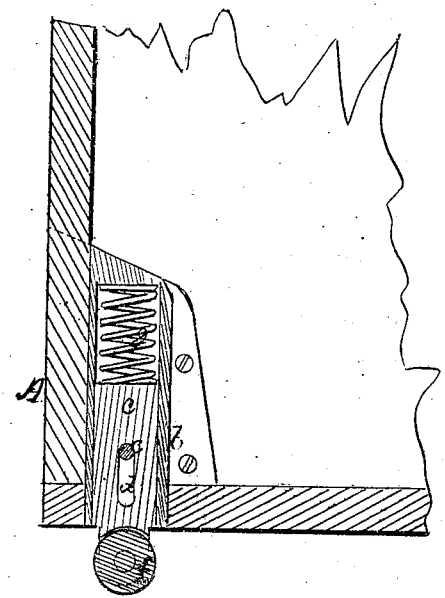

Figure 1 is a horizontal section of the invention, showing a portion of a trunk connected therewith, Figure 2 is a side view of the invention, looking into the inside of the trunk, and Figure 3 is a vertical section of the invention.

There are numerous devices for casters for trunks, furniture, &c., and all are for the same purpose, namely, to protect the trunk, or other manufacture, from injury to itself and injury to the contents thereby supported. Our invention has the same object in view, and we claim that it is superior to any now in use; and, for the benefit of others manufacturing, we will explain its nature and mode of construction.

By examining the several figures in the accompanying drawings, its construction and its mode of application to the trunk can be readily seen. The caster is made of cast iron or any suitable metal, having two of its sides at right angles, or so as to fit into the corner of a trunk inside, and setting upon the bottom of the trunk, and made so that it can be fastened to the sides by screws or otherwise. The lower or rounded part of the caster passes through the bottom of the trunk flush with the outer surface, the bottom having been pierced for the purpose. Within the socket of the caster is a spiral spring, $g$, (see fig. 3,) and into the socket, and below the spring, passes the bolt $c$, its lower part being slotted and extending below the trunk, embracing by its flanges the roll or wheel $f$, which wheel is kept in its place by a rivet. There is also a slot, $d$, in which plays the pin $e$; the use of this is to keep the bolt from dropping out. These flanges of the bolt, embracing the wheel, are rounded, and so as to conform to the surface of the wheel, thereby saving friction when the trunk is moved in any direction. The bolt is made of malleable iron or any suitable metal. When the trunk is thrown down violently, the wheel and bolt are pressed up into the socket, thereby breaking the blow which might otherwise shatter the trunk or injure the contents therein. If the trunk is pulled lengthwise, the wheel of the castor turns as in ordinary cases, the spring preventing the shock to the trunk, &c. If the trunk is pulled sidewise, the wheel and flanges of the bolt, being rounded, will slide. If thrown so as to strike on the slant of the bolt, it will act sufficiently on the spring to prevent a break, being strengthened by the protection of the socket. The caster being placed in the inside of the trunk in this manner, the trunk is strengthened by the caster, and the caster is protected by the trunk.

What we claim as our invention, and desire to secure by Letters Patent, is—

The combination and arrangement of the several parts of the caster, namely, the bolt $c$ with its wheel $f$, the slot $d$, the pin $e$, and the spring $g$, all in combination, and operating substantially in the manner and for the purpose above set forth.

W. H. YOUNG,
L. YOUNG.

Witnesses:
J. L. NEWTON,
L. F. LAMBERT.